(12) United States Patent
Monma et al.

(10) Patent No.: US 9,550,853 B2
(45) Date of Patent: Jan. 24, 2017

(54) METHOD FOR PRODUCING POLYACETAL COPOLYMER

(71) Applicant: Polyplastics Co., Ltd., Tokyo (JP)

(72) Inventors: Tomohiro Monma, Fuji (JP); Eiji Masuda, Fuji (JP); Shoji Sanada, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 14/786,246

(22) PCT Filed: Apr. 4, 2014

(86) PCT No.: PCT/JP2014/059957
§ 371 (c)(1),
(2) Date: Oct. 22, 2015

(87) PCT Pub. No.: WO2014/175042
PCT Pub. Date: Oct. 30, 2014

(65) Prior Publication Data
US 2016/0075815 A1    Mar. 17, 2016

(30) Foreign Application Priority Data

Apr. 25, 2013  (JP) ................. 2013-092810

(51) Int. Cl.
*C08G 2/12* (2006.01)
*C08G 2/10* (2006.01)
(Continued)

(52) U.S. Cl.
CPC . *C08G 2/12* (2013.01); *C08G 2/06* (2013.01);
*C08G 2/10* (2013.01); *C08G 2/22* (2013.01);
*C08G 4/00* (2013.01); *C08L 59/04* (2013.01)

(58) Field of Classification Search
CPC ....................................................... C08G 2/24
(Continued)

(56) References Cited

U.S. PATENT DOCUMENTS 4,661,570 A    4/1987  Yamawaki et al.
5,886,139 A    3/1999  Yamamoto et al.
(Continued)

FOREIGN PATENT DOCUMENTS

CN    1165832 A     11/1997
JP    S61-238812 A  10/1986
(Continued)

*Primary Examiner* — Duc Truong
(74) *Attorney, Agent, or Firm* — Knobbe Martens Olson & Bear LLP

(57) ABSTRACT

A high-quality polyacetal copolymer produced by a simple process and in an economical manner. The method includes supplying a raw material including trioxane or the like to a reaction device; obtaining a reaction mixture by carrying out a polymerization reaction of the raw material in the state where the rotating shafts are inclined by 1 to 6° upwards with respect to the horizontal direction H from the introduction opening towards a polyacetal copolymer recovery portion; vaporizing and separating an unreacted monomer from the reaction mixture using a vaporization and separation portion; re-supplying the unreacted monomer to the reaction device; and recovering the polyacetal copolymer from the reaction using a polyacetal copolymer recovery portion.

9 Claims, 1 Drawing Sheet

(51) Int. Cl.
*C08G 2/06* (2006.01)
*C08G 2/22* (2006.01)
*C08G 4/00* (2006.01)
*C08L 59/04* (2006.01)
*C08G 2/00* (2006.01)

(58) Field of Classification Search
USPC .......................................................... 528/232
See application file for complete search history.

(56) References Cited

U.S. PATENT DOCUMENTS

| | | |
|---|---|---|
| 6,139,804 A | 10/2000 | Tanigawa et al. |
| 2007/0191588 A1 | 8/2007 | Schwittay et al. |

FOREIGN PATENT DOCUMENTS

| | | |
|---|---|---|
| JP | H05-008725 B2 | 2/1993 |
| JP | H09-278852 A | 10/1997 |
| JP | H10-330443 A | 12/1998 |
| JP | H11-124422 A | 5/1999 |
| JP | H11-255854 A | 9/1999 |
| JP | 2007-538122 A | 12/2007 |
| WO | WO 96/13534 A1 | 5/1996 |

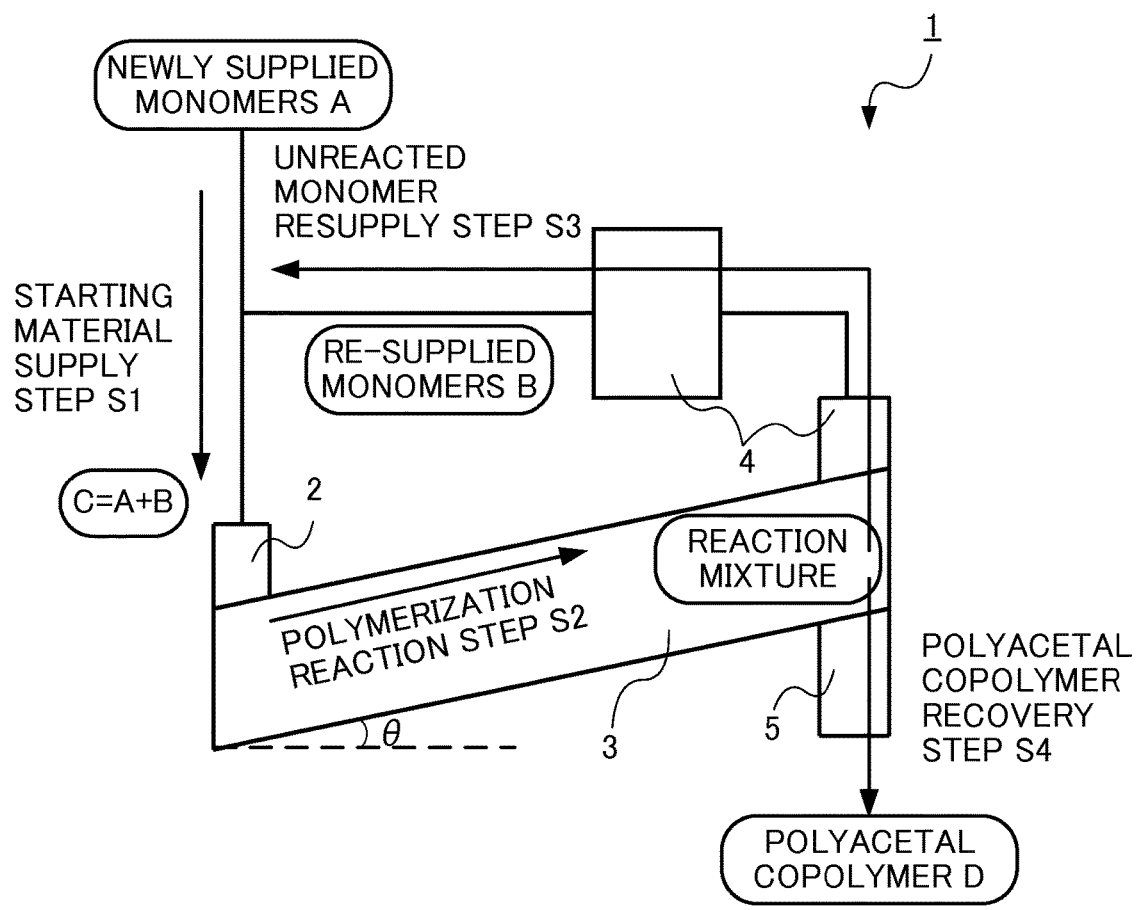

METHOD FOR PRODUCING POLYACETAL COPOLYMER

This application is the U.S. National Phase under 35 U.S.C. §371 of International Application PCT/JP2014/059957, filed Apr. 4, 2014, designating the U.S., and published in Japanese as WO 2014/175042 on Oct. 30, 2014, which claims priority to Japanese Patent Application No. 2013-092810, filed Apr. 25, 2013, the entire contents of which are incorporated herein by reference.

TECHNICAL FIELD

The present invention relates to a method for producing a polyacetal copolymer.

BACKGROUND ART

Until now, as a production method for a polyacetal copolymer, a cationic copolymerization with trioxane as a main monomer, and a cyclic ether and/or cyclic formal having at least one carbon-carbon bond as a comonomer has been known. As the cationic active catalyst used for these copolymerizations, a Lewis acid, in particular halides of boron, tin, titanium, phosphorous, arsenic, and antimony, for example boron trifluoride, tin tetrachloride, titanium tetrachloride, phosphorous pentachloride, phosphorous pentafluoride, arsenic pentafluoride, and antimony pentafluoride, and their complex compounds or salts; protonic acids, for example perchloro acids; esters of protonic acids, in particular esters of perchloro acids and lower aliphatic alcohols, for example perchloro acid-tertiary butyl ester; anhydrides of protonic acids, especially mixed anhydrides of perchloro acids and lower aliphatic carboxylic acids, for example acetyl perchlorate, or trimethyloxoniumhexafluorophosphate, triphenyl-methylhexafluoroacetate, acetyltetrafluoroborate, acetylhexafluorophosphate, and acetylhexafluoroarsenate, and the like have been proposed. Among these, boron trifluoride or coordination compounds of boron trifluoride and organic compounds, for example ethers, are the most common as polymerization catalysts with trioxane as the main monomer, and are widely used industrially.

However, with commonly used polymerization catalysts such as boron trifluoride type compounds, in the later phase of polymerization the polymerization speed suddenly decreases, and it is nearly impossible to obtain polymer conversion ratio of near 100% in a short time, and a very long time is required, which is inefficient, and moreover, in the later phase of polymerization, decomposition of the generated polymer by the catalyst becomes relatively dominant, which not only causes a reduction in molecular weight, but also has the effect of degrading the qualities such as heat resistance and the like. Further, if the amount of the polymerization catalyst is increased, overall the polymerization speed is enhanced, and the polymer conversion ratio is also increased, but the quality of the generated rough polymer degrades more and more, and in a later step a complex stabilization treatment is required, whereby the production operation overall is by no means a preferable method.

Accordingly, the technique of adding a solution comprising a catalyst deactivation agent at a stage where the polymer conversion ratio is relatively low to stop the polymerization, then washing, recovering and purifying and reusing the remaining unreacted monomers, is widely practiced.

Further, there have been various proposals for improving the polymerization apparatus and the method of supplying the catalyst, in addition to increasing the polymer conversion ratio. For example, a technique of increasing the polymer conversion ratio for a device by inclining the polymerization device 1 to 10° (Patent Document 1), a technique of providing a weir at the discharging port of the polymerization apparatus (Patent Document 2), as well as a technique of mixing the catalyst with the comonomer in advance, and supplying this to the trioxane (Patent Documents 3 and 4) have been proposed. These techniques are all effective for increasing the polymer conversion ratio for the case of using a boron trifluoride type polymerization catalyst.

Further, a method has also been proposed to deactivate the rough polymer in the later stage of the polymerization by using a high activity, non-volatile polymerization catalyst, to directly recover the unreacted monomer without carrying out washing, and reuse the same (Patent Document 5). In this technique, it is possible to carry out recovery of the monomers directly from the rough polymer before deactivation, which was difficult with the boron trifluoride system commonly used in the prior art, and moreover, secondary reactions at a stage where a high conversion ratio has been achieved do not readily occur compared to a boron trifluoride type polymerization catalyst, whereby it is possible to obtain a rough polymer which is excellent in thermal stability with little unreacted monomers by extremely simple steps.

Patent Document 1: Japanese Examined Patent Application Publication No. H05-008725
Patent Document 2: PCT International Publication No. WO1996/013534
Patent Document 3: Japanese Unexamined Patent Application, Publication No. H11-255854
Patent Document 4: Japanese Unexamined Patent Application, Publication No. H11-124422
Patent Document 5: Japanese Unexamined Patent Application, Publication No. H09-278852

DISCLOSURE OF THE INVENTION

Problems to be Solved by the Invention

However, in the case of adding a solution comprising a deactivation agent of the catalyst and stoping the polymerization at a stage where the polymer conversion ratio is relatively low, washing, recovering and purifying, and reusing the remaining unreacted monomer, the unreacted monomer is recovered as a solution where the concentration is relatively low, and therefore, in order to reuse the unreacted monomer, it is required to use complex operations of separation and purification, as well as energy. On the other hand, abandoning the recovery of the unreacted monomer becomes a total loss, and neither way is economically preferable.

Further, in the techniques disclosed in Patent Documents 1 to 4, the obtained rough polymer is one which comprises at least 10 wt % of unreacted monomer, and in practical applications, it is required to go through deactivation and washing steps, moreover, for boron trifluoride type polymerization catalysts, the inevitability of secondary reactions such as decomposition and the like at the stage where a high conversion ratio has been achieved still remains a problem.

Further, in the technique disclosed in Patent Document 5, there is room for improvement in increasing the quality of the polyacetal copolymer and reducing costs.

Accordingly, the present invention has the objective of producing a high quality polyacetal copolymer economically and with a simple process.

Means for Solving the Problems

The present inventors, in order to solve the above problems, as a result of repeated diligent study of polymerization reactions of trioxane, discovered that by carrying out the polymerization reaction of the raw materials under the conditions of (a) using a non-volatile protonic acid as the polymerization catalyst, and (b) inclining the rotating shafts of the reaction device 1 to 6° upwards with respect to the horizontal direction from the input opening of the reaction device towards the output opening, when compared to the case of using a boron trifluoride type polymerization catalyst of the prior art, it is possible to obtain a remarkably high polymer conversion ratio, as well as a high quality polyacetal copolymer, and thus completed the present invention. Specifically, the present invention provides the following.

(1) The present invention is a method for producing a polyacetal copolymer comprising a raw material supply step of supplying a raw material comprising trioxane, a comonomer which copolymerizes with this trioxane, and a non-volatile protonic acid, to a continuous stirring mixer type reaction device having two parallel shafts which rotate in the same direction as each other or in opposite directions, a multitude of paddles mounted on each shaft, and a barrel which comes close to an outer circumference of the paddles, and constituted such that a long axis end of a paddle periodically comes close to a short axis end of a companion side, wherein the raw material is charged from an introduction opening provided at one end in an axial direction, and a reaction mixture and an unreacted monomer are obtained from a plurality of removal openings provided at the other end; a polymerization reaction step of carrying out a polymerization reaction of the raw material in a state where the rotating shafts are inclined by 1 to 6° upwards with respect to a horizontal direction from an input opening of the reaction device towards an output opening, and obtaining a reaction mixture; an unreacted monomer re-supply step of vaporizing and separating an unreacted monomer from the reaction mixture, and supplying the same to the raw material supply step; and a polyacetal copolymer recovery step of recovering the polyacetal copolymer from the reaction mixture; wherein a weight ratio D/C of the polyacetal copolymer D with respect to a total supplied monomer C which is stipulated as a sum of a monomer A which is newly supplied to the reaction device and a monomer B which is recovered from the reaction device and re-supplied, is no less than 0.7; and a weight ratio D/A of the polyacetal copolymer D with respect to the monomer A which is newly supplied to the reaction device is no less than 0.85.

(2) Further, the present invention is a method for producing a polyacetal copolymer as disclosed in (1), wherein a content of the unreacted monomer included in the polyacetal copolymer is no more than 1.0 wt %, and the polyacetal copolymer comprises no less than 90 wt % of particles with a particle diameter of no more than 11.2 mm.

(3) Further, the present invention is a method for producing a polyacetal copolymer as disclosed in (1) or (2), wherein L/d which is stipulated by a ratio of a length L in a direction of the rotating shafts of the reaction device with respect to an inner diameter d in a radial direction of the rotating shafts of the reaction device, is no less than 5 and no more than 20.

(4) Further, the present invention is a method for producing a polyacetal copolymer as disclosed in any one of (1) to (3), wherein the non-volatile protonic acid comprises at least one selected from a heteropoly acid, an isopoly acid, or an acid salt thereof.

(5) Further, the present invention is a method for producing a polyacetal copolymer as disclosed in any one of (1) to (3), wherein the non-volatile protonic acid is a heteropoly acid shown by formula (1) below or an acid salt thereof

  Formula (1)

wherein, in the formula (1), M is a central element selected from P and/or Si, M' is one or more coordination element selected W, Mo, and V, and l is 10 to 100, m is 1 to 10, n is 6 to 40, x is 1 or more, and y is 0 to 50.

(6) Further, the present invention is a method for producing a polyacetal copolymer as disclosed in (5), wherein the heteropoly acid or acid salt thereof comprises at least one compound selected from phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolibdic acid, silicomolybdotungstic acid, silicomolybdotungstovanadic acid, or acid salts thereof.

(7) Further, the present invention is a method for producing a polyacetal copolymer as disclosed in any one of (1) to (3), wherein the non-volatile protonic acid comprises an isopoly acid shown by formula (2) or (3) below or an acid salt thereof

  Formula (2)

  Formula (3)

wherein, in the formulas (2) and (3), $M^I$ is hydrogen, but which may be partially substituted with a metal, $M^V$ is at least one selected from V, Nb, and Ta of the V group of the periodic table, $M^{VI}$ is at least one selected from Cr, Mo, W, and U of the VI group of the periodic table, p and x are 1 or more, and y is 0 to 50.

(8) Further, the present invention is a method for producing a polyacetal copolymer as disclosed in (7), wherein the isopoly acid or acid salt thereof comprises at least one compound selected from paratungstic acid, metatungstic acid, paramolybdic acid, metamolybdic acid, paravanadic acid, metavanadic acid, and acid salts thereof.

(9) Further, the present invention is a method for producing a polyacetal copolymer as disclosed in any one of (1) to (8), wherein the comonomer comprises at least one selected from 1,3-dioxolane, diethylene glycol formal, 1,4-butanediol formal, and ethylene oxide.

Effects of the Invention

According to the present invention, it is possible to economically produce a high quality polyacetal copolymer by a simple process.

BRIEF DESCRIPTION OF THE DRAWINGS

FIG. 1 is a schematic diagram for explaining the reaction device 1.

PREFERRED MODE FOR CARRYING OUT THE INVENTION

Below, specific embodiments of the present invention are explained in detail, but the present invention is not at all limited by the following embodiments, and the present invention may also be practiced with the addition of suitable modifications which are within the scope of the objective of the present invention.

The production method of the present invention comprises a raw material supply step (S1), a polymerization reaction step (S2), an unreacted monomer re-supply step (S3), and a polyacetal copolymer recovery step (S4).

Reaction Device 1

For explaining the steps (S1) to (S4), first an explanation will be given of the schematic constitution of the reaction device 1 with reference to FIG. 1. FIG. 1 is a schematic diagram for explaining the reaction device 1. The reaction device 1 is provided with introduction opening 2 to introduce the raw material, a mixing portion 3 to carry out the polymerization reaction of these raw materials and obtain a reaction mixture, a vaporization and separation portion 4 for vaporizing and separating the unreacted monomers from the reaction mixture, and a polyacetal copolymer recovery portion 5 for recovering the polyacetal copolymer from the reaction mixture.

The mixing portion 3 is a continuous stirring and mixing apparatus having two parallel shafts which rotate in the same direction as each other or in opposite directions, a multitude of paddles mounted on each shaft, and a barrel which comes close to an outer circumference of the paddles, and constituted such that a long axis end of a paddle periodically comes close to a short axis end of a companion side, wherein the raw materials are charged from the introduction opening provided at one end in the axial direction, and the reaction mixture and the unreacted monomer are obtained from a plurality of removal openings provided at the other end. When polymerization-reacting the raw material, the outlet side is elevated, and the rotating shafts are inclined 1 to 6° upwards with respect to the horizontal direction H from the input opening (introduction opening 2) of the reaction device 1 towards the output opening (polyacetal copolymer recovery portion 5). If the inclination angle (θ) is less than 1°, the retention time of the raw materials inside the reaction device 1 becomes too short, and this is not preferable in the point that there is the possibility that a sufficient polymer conversion ratio cannot be obtained. Further, if the inclination angle is less than 1°, the particle diameter of the recovered polyacetal copolymer becomes large, and as a result, the remaining amount of monomer in the copolymer becomes excessive, which is disadvantageous in economy and quality. If the inclination angle exceeds 6°, a considerable burden is applied to the machinery supporting the rotating shafts and applying the rotational power, therefore, this is not preferable because difficulties may arise in the long term operation.

The mixing portion 3 has a jacket for temperature control, and the temperature is adjusted by flowing a liquid or gas. It is also possible to provide a plurality of jackets in the axial direction, and individually control their temperature.

Further, the size of the reaction device 1 is not particularly limited, but L/D which is stipulated as the ratio of the length L in a direction of the rotating shafts of the reaction device 1 with respect to the inner diameter d in the radial direction of the rotating shafts (the direction perpendicular to the rotating shafts) of the reaction device 1 is preferably no less than 5 and no more than 20. If L/d is less than 5, there is the possibility that a sufficient polymer conversion ratio will not be obtained, and if it exceeds 20, fluctuations and offsets of the clearance due to deflection of the rotating shafts may readily arise, and this is not preferable from the points of working accuracy and operational stability.

Further, the clearance between the end of the paddles and the inner face of the barrel is preferably no more than 2% of the diameter of a circumscribed circle of the paddle, and more preferably no more than 1%.

Further, the rotation speed of the paddles is not particularly limited, but preferably the rotational circumferential speed of the ends of the paddles is no more than 1.5 m/sec.

Further, the rotation direction of the two rotating shafts may be the same for both, or may be different directions to each other.

Raw Material Supply Step (S1)

Next, the raw material supply step (S1) will be explained. The raw material supply step is a step of supplying to the above described reaction device 1 the raw materials comprising trioxane, a comonomer which copolymerizes with this trioxane, and a non-volatile protonic acid. Further, for ease of understanding, in FIG. 1, it is disclosed that a mixture of all of the raw materials is introduced into the introduction opening 2, but without being limited to this condition, is it sufficient that all of the raw materials are ultimately input to the introduction opening 2.

[Comonomer]

As the comonomer, a compound selected from cyclic ethers and cyclic formals having at least one carbon-carbon bond is used. As representative examples of the compound used as the comonomer, for example, 1,3-dioxolane, diethyleneglycol formal, 1,4-butanediol formal, 1,3-dioxane, ethylene oxide, propylene oxide, epichlorohydrin and the like may be mentioned. Among these, in consideration of the stability of the polymerization, 1,3-dioxolane, diethylene glycol formal, 1,4-butanediol formal, 1,3-dioxane, and ethylene oxide and the like are preferable. Further, a cyclic ester, for example β-propiolactone, or a vinyl compound, for example styrene and the like can be used. Further, as the comonomer, it is possible to use a monofunctional cyclic ether or cyclic formal having a substituent unit such as butyl glycidyl ether or 2-ethylhexyl glycidyl ether. Furthermore, as the comonomer, it is possible to use a compound having two polymerizable cyclic ether groups or cyclic formal groups such as a diformal or a diglycidyl ether of alkylene glycol, for example, butanediol dimethylidine glycerol ether, butanediol diglycidyl ether, and the like, or a compound having three or more polymerizable cyclic ether groups or cyclic formal groups such as glycerine triglycidyl ether, trimethylol propane triglycidyl ether, pentaerythyritol tetraglycidyl ether, and the like. Polyacetal copolymers formed therefrom with branched structures or bridged structures are also subjects of the present invention.

In the present invention, the amount of the compound selected from cyclic ethers and cyclic formals for use as the comonomer is 0.1 to 20 mol % as a ratio of all of the monomers (the total amount of the trioxane which is the main monomer and the comonomer), and preferably 0.2 to 10 mol %. Less than 0.1 mol % is not preferable because the unstable terminal end portions of the rough polyacetal copolymer produced by the polymerization increase and the stability worsens, and further, a produced copolymer with an excessive amount of comonomer becomes soft and a reduction in the fusion point occurs.

In the present invention, at the time of polymerizing the above main monomer and comonomer and preparing the polyacetal copolymer, in order to control the polymerization degree, a publicly known chain transfer agent, for example a methylal-like low molecular weight linear acetal or the like may be added.

Further, the polymerization reaction is preferably carried out under conditions where impurities having active hydrogen, for example, water, methanol, formic acid, or the like are not substantially present, for example, where each is no more than 10 ppm, and for this, it is preferable to use as the main monomer and comonomer a trioxane, cyclic ether and/or cyclic formal which have been prepared so that these impurity components are not included, as far as possible.

[Non-Volatile Protonic Acid]

In the present invention, a non-volatile protonic acid functions as the polymerization catalyst. In the present invention, because a non-volatile protonic acid, and not a boron trifluoride type catalyst, is used as a polymerization catalyst, compared to the case of using a boron trifluoride type catalyst as the polymerization catalyst, the polymer conversion ratio can be increased.

As examples of a non-volatile protonic acid, compounds comprising at least one selected from heteropoly acids, isopoly acids, and acid salts thereof can be mentioned. A heteropoly acid is a polyacid produced by a dehydration condensation of different oxyacids, with a specified hetero element at its center, and has mononuclear or polynuclear complex ions which can be formed by condensing condensation acid radicals sharing an oxygen atom. An isopoly acid is a high molecular weight inorganic oxyacid consisting of a condensate of an inorganic oxyacid having a pentavalent or hexavalent single type of metal, and is also referred to as an iso polyacid, homonuclear condensation acid, or homogeneous polyacid.

[Heteropoly Acid or Acid Salt Thereof]

First, the heteropoly acid or acid salt thereof will be explained in detail. A heteropoly acid or acid salt thereof can be shown by the formula (1) below.

$$H_x[M_m \cdot M'_n O_l] \cdot y H_2O \quad \text{Formula (1)}$$

A heteropoly acid which is especially effective as a polymerization catalyst in the present invention is one where in the above compositional formula, the central element M is at least one element selected from P and/or Si, and the coordination element M' is one or more element selected from W, Mo, and V. From the viewpoint of polymerization activity, the coordination element M' is preferably W or Mo. Further, in the formula (1), 1 is 10 to 100, m is 1 to 10, n is 6 to 40, x is 1 or more, and y is 0 to 50.

Further, an acid salt where the $H_x$ in formula (1) is substituted with various metals or the like may also be used as the catalyst in the present invention.

As specific examples of the heteropoly acid, phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolibdic acid, silicomolybdotungstic acid, silicomolybdotungstovanadic acid, and the like may be mentioned. In particular, from the viewpoint of polymerization activity, the heteropoly acid is preferably selected from silicomolibdic acid, silicotungstic acid, phosphomolybdic acid, and phosphotungstic acid.

[Isopoly Acid and Acid Salt Thereof]

Next, the isopoly acid or acid salt thereof will be explained in detail. A heteropoly acid or acid salt thereof can be shown by the formula (2) or formula (3) below.

$$xM^I_2O \cdot pM^V_2O_6 \cdot y H_2O \quad \text{Formula (2)}$$

$$xM^I_2O \cdot pM^{VI}_2O_6 \cdot y H_2O \quad \text{Formula (3)}$$

wherein, in the formulas (2) and (3), $M^I$ is hydrogen, but which may be partially substituted with a metal, $M^V$ is at least one selected from V, Nb, and Ta of the V group of the periodic table, $M^{VI}$ is at least one selected from Cr, Mo, W, and U of the VI group of the periodic table, p and x are 1 or more, and y is 0 to 50.

The isopoly acid, besides a method of treating an isopoly acid salt solution with an ion exchange resin, can be prepared by various methods such as adding a mineral acid to a concentrated solution of an isopoly acid salt with ether extraction, and the like. Further, the present invention is not limited to an isopoly acid, and an acid salt of an isopoly acid may also be used as a polymerization catalyst. The isopoly acid may be any of the above described formulas (2) and (3), but from the viewpoint of polymerization activity, it is preferably an isopoly acid of formula (3) or an acid salt thereof.

As specific examples of suitable isopoly acids, isopoly tungstic acids exemplified by paratungstic acid, metatungstic acid and the like, isopolymolibdic acids which can be exemplified by paramolibdic acid, metamolibdic acid, and the like, and metapolyvanadic acid, isopolyvanadic acid and the like can be mentioned. Among these, from the viewopoint of polymerization activity, isopolytungstic acid is preferable.

[Solvent]

In order to carry out the reaction uniformly, the polymerization catalyst is diluted in an inactive solvent which has no adverse effects on the polymerization, and is desirably used by adding to the main monomer and/or the comonomer. As the above mentioned inactive solvent, an ester obtained from the condensation of a low molecular weight carboxylic acid with a carbon number of 1 to 10 such as formic acid, acetic acid, propionic acid, butyric acid and the like, and a low molecular weight alcohol with a carbon number of 1 to 10 such as methanol, ethanol, 1-propanol, 2-propanol, 1-butanol, 2-butanol, 2-methyl-1-propanol, 2-methyl-2-propanol, 1-pentanol, 3-methyl-1-butanol, 1-hexanol and the like; or a low molecular weight ketone with a carbon number of 1 to 10 such as acetone, 2-butanone, 2-pentanone, 3-pentanone, 2-hexanone, 3-hexanone, methylisobutyl ketone, methyl-t-butyl ketone and the like, can be preferably mentioned, but it is not limited to these. When also taking into consideration ease of industrial availability and the like, methyl formate, ethyl formate, methyl acetate, ethyl acetate, butyl acetate, acetone, 2-butanone, methyl isobutyl ketone and the like are most favorable. The polymerization catalyst is dissolved in the above inactive solvent, suitably in a concentration of 1 to 30 mass/wt %, but is not limited to this. Further, it is also a preferable method to carry out the polymerization by mixing in advance the above specified amount of the polymerization catalyst with a portion or all of, one of or a plurality of the above mentioned main monomer, comonomer, molecular weight modifying agent and the like, and adding this solution to the polymerization system.

Polymerization Reaction Step (S2)

Next, the polymerization reaction step (S2) will be explained. The polymerization reaction step (S2) is a step of obtaining a reaction mixture by carrying out a polymerization reaction of the raw materials under conditions where the rotating shafts are included 1 to 6° upwards with respect to the horizontal direction H from the input opening (introduction opening 2) of the reaction device 1 to the output opening (polyacetal copolymer recovery portion 5).

It was discovered that in a polymerization reaction step having such an inclination, compared to a $BF_3$ catalyst of the prior art, a non-volatile protonic acid such as the above described heteropoly acid can provide a higher polymerization rate in the reaction device.

The polymerization method is not particularly limited, and for example, the technique disclosed in Japanese Unexamined Patent Application, First Publication No. H11-302349 is suitable. In this technique, trioxane, the comonomer, and the non-volatile protonic acid are held in advance in liquid form and sufficiently mixed, and the obtained reaction raw material mixed liquid is supplied to the polymerization device 1 and copolymerization is carried out. By this technique, it is possible to restrain the amount of the non-volatile protonic acid and as a result, and this is advantageous in that it is possible to obtain a polyacetal copolymer with a smaller amount of formal aldehyde emissions.

The polymerization temperature is not particularly limited, but is preferably carried out at 60 to 115° C., and more preferably carried out at 65 to 110° C. If less than 60° C., there is the possibility that the monomers will separate, and if more than 115° C., there is the possibility that the monomer will boil and the proportion of polymer in the finally obtained reaction mixture will be reduced.

Unreacted Monomer Re-Supply Step (S3)

The unreacted monomer re-supply step (S3) is a step of vaporizing and separating the unreacted monomer from the reaction mixture and re-supplying the same to the reaction device 1.

The technique of vaporizing and separating is not particularly limited, but the activity of the non-volatile protonic acid which is the polymerization catalyst is extraordinarily high, and it is possible to obtain a high conversion ratio in a short time, thus, from the viewpoint of further simplifying these steps, in the vaporization and separation portion 4, a circulation mechanism of reduced pressure, aspiration, or gas flow of inert gas is provided, and vaporization and separation of the monomer is carried out.

However, if necessary, any of a method of using a two or more stage polymerization apparatus where polymerization is carried out up to a prescribed polymerization rate in the first stage polymerization device, and after this, moving to a later stage device, and vaporizing and separating the unreacted monomer while simultaneously continuing the polymerization reaction, or a method of deactivating the catalyst under the presence of a catalyst deactivation agent and concurrently vaporizing and removing unreacted monomers, or the like is possible, and the embodiments may be applied in various other combinations.

In the methods of the prior art, the monomer which was unreacted in the later stage of the polymerization reaction was removed from the rough polymer in a later catalyst deactivation and washing step, and was separated and collected as a low concentration solution, therefore, before it can be re-supplied to the reaction system, it must be concentrated and purified, which requires a large amount of energy, and further, if the recovery of the monomer is abandoned, it becomes a complete loss, and either way, it is not possible to avoid a loss in the polymerization reaction.

On the other hand, in the present invention, the unreacted monomer is removed without going through steps such as catalyst deactivation or washing or the like. Therefore, because the unreacted solvent does not include a solvent or the like, it can be re-supplied to the reaction device 1 while carrying out only an extremely simple purification process. Therefore, there is no polymerization loss of the unreacted monomer. Namely, the total monomer C supplied to the polymerization device consists of, in addition to the newly supplied monomer A, the monomer B recovered from the polymerization device and re-supplied (C=A+B). Therefore, this has the advantage that, with respect to the newly supplied monomer, the proportion of the obtained rough polymer is extraordinarily high.

Polyacetal Copolymer Recovery Step (S4)

The polyacetal copolymer recovery step (S4) is a step of recovering the polyacetal copolymer from the reaction mixture.

The recovered polyacetal copolymer is preferably one comprising 90 wt % or more of particles having a particle diameter of no more than 11.2 mm. This is because, if the particle diameter exceeds 11.2 mm, there is the possibility that the amount of remaining monomer in the recovered polyacetal copolymer will become excessive. Further, in the present specification, unless otherwise noted, the particle diameter is taken as the screen aperture through which the copolymer has passed.

Further, with respect to the recovered polyacetal copolymer, by using the technique disclosed in Japanese Unexamined Patent Application, First Publication No. 2003-26746, namely, a technique where a solid basic compound is added to the polyacetal copolymer as-is without carrying out washing, and undergoing a melt kneading treatment, it is possible to complete the deactivation of the polymerization catalyst (the non-volatile protonic acid) included in the polyacetal copolymer.

By undergoing the above described steps (S1) to (S4), the weight ratio D/C of the polyacetal copolymer D with respect to the total supplied monomer C(=A+B) stipulated by the sum of the monomer A newly supplied to the reaction device 1 and the monomer B recovered from the reaction device 1 and re-supplied becomes no less than 0.7. Further, the weight ratio D/A of the polyacetal copolymer D with respect to the monomer A newly supplied to the reaction device 1 become no less than 0.85.

EXAMPLES

Below, the present invention is specifically explained with reference to examples, but the present invention is not limited thereto.

TABLE 1

| | Example | | | | | | | Comparative Example | | | |
|---|---|---|---|---|---|---|---|---|---|---|---|
| | 1 | 2 | 3 | 4 | 5 | 6 | 7 | 1 | 2 | 3 | 4 |
| comonomer | DOXO | DOXO | DOXO | DOXO | DOXO | DOXO | DOXP | DOXO | DOXO | DOXO | DOXO |
| polymerization catalyst | HPA | HPA | HPA | HPA | IPA | IPA | IPA | HPA | $BF_3$ | $BF_3$ | $BF_3$ |
| polymerization catalyst amount with respect to the total supplied monomer | 2 | 2 | 2 | 2 | 4 | 4 | 4 | 2 | 20 | 20 | 20 |
| slope angle (°) | 1 | 2 | 3 | 5 | 2 | 5 | 5 | 0 | 0 | 2 | 5 |

The abbreviations in Table 1 are as follows. (comonomer)
DOXO: 1,3-dioxolane
DOXP: 1,3-dioxepane
(polymerization catalyst)
HPA: phosphomolybdic acid (non-volatile protonic acid)
IPA: paratungstic acid (non-volatile protonic acid)
$BF_3$: boron trifluoride (dibutyl ether complex) (well-known polymerization catalyst of the prior art)
Examples and Comparative Examples Using the reaction device 1 shown in FIG. 1, with warm water at a temperature of 85° C. flowing in the jacket, the two rotating shafts are made to rotate in the same direction at a fixed speed such that the rotational circumferential speed of the ends of the paddles is 0.5 m/sec, and 3.0 wt % of the comonomer shown in Table 1, and trioxane comprising 700 ppm of methylal as a molecular weight adjusting agent are continuously supplied through the introduction opening 2, and at the same time, the polymerization catalyst shown in Table 1 is continuously added and adjusted with methyl formate such that the polymerization catalyst amount with respect to the total supplied monomers is the amount shown in Table 1, whereby copolymerization of the trioxane and the comonomer was carried out. When copolymerizing, the rotating shafts were inclined upwards by only the angle shown in FIG. 1 with respect to the horizontal direction H from the input opening (introduction opening 2) of the reaction device 1 towards the output opening (polyacetal copolymer recovery portion 5).

Then, the unreacted monomer was vaporized and separated from the reaction system by the vaporization and separation portion 4, led to the condensation container (not shown in the figure) and collected, and re-supplied to the reaction device 1 by the introduction opening 2 along with the newly supplied monomer, and along with this, the polyacetal copolymer was recovered from the polyacetal copolymer recovery portion 5.

Evaluation

In the Examples and Reference Examples, the retention time in the reaction device 1, the polymer conversion ratio of the raw materials, the particle diameter and the remaining amount of the monomer of the recovered polyacetal copolymer were measured.

[Retention Time]

The evaluation of the retention time is measured as the time until 1 wt % carbon black which is supplied by the raw material supply portion 2 is discharged by the polymer recovery portion 5.

[Polymer Conversion Ratio of the Raw Materials]

The evaluation of the polymer conversion ratio of the raw materials is carried out by the two types of measurement, of the weight ratio (%) of the recovered polyacetal copolymer with respect to the total supplied monomer, and the weight ratio (%) of the recovered polyacetal copolymer with respect to the monomer included in the raw materials. First, the weight A of the monomer included in the raw material, and the weight C of the total supplied monomer are measured. Next, the obtained product after the polymerization reaction, after washing with a deactivation agent solution (triethylamine 2 wt % aqueous solution), is dried and the weight D of the thereby obtained polymer is measured. Then, D/C× 100, and D/A×100 are calculated. The results are shown in Table 2.

[Particle Diameter of the Recovered Polyacetal Copolymer]

The particle diameter of the recovered polyacetal copolymer was measured. The proportion of particles with a particle diameter of 11.2 mm or less, which have passed through a sieve with openings of 11.2 mm, is shown in FIG. 2.

[Remaining Monomer Amount]

The remaining amount of the monomer is determined by washing the recovered polyacetal copolymer with a 2 wt % aqueous solution of triethylamine, and using gas chromatography to determine the amount of the monomer in the washing solution. The weight % of the content of the monomer with respect to the content of the recovered polyacetal copolymer is shown in FIG. 2.

TABLE 2

|  | Example | | | | | | | Comparative Example | | | |
|---|---|---|---|---|---|---|---|---|---|---|---|
|  | 1 | 2 | 3 | 4 | 5 | 6 | 7 | 1 | 2 | 3 | 4 |
| retention time (min.) | 8.0 | 8.1 | 8.0 | 8.3 | 8.1 | 8.3 | 8.2 | 6.7 | 6.8 | 8.1 | 8.3 |
| weight ratio D/C with respect to the total supplied monomer C of the recovered polymer D | 0.71 | 0.72 | 0.74 | 0.74 | 0.72 | 0.74 | 0.74 | 0.62 | 0.60 | 0.67 | 0.67 |
| weight ratio D/C with respect to the newly supplied monomer A of the recovered polymer D | 0.85 | 0.86 | 0.86 | 0.88 | 0.85 | 0.87 | 0.87 | 0.73 | not possible to recover unreacted monomer 0.601 | not possible to recover unreacted monomer 0.665 | not possible to recover unreacted monomer 0.671 |
| proportion of particle diameter of 15 → 11.2 mm or less in the recovered polymer | 92 | 92 | 93 | 94 | 93 | 94 | 94 | 80 | 82 | 90 | 91 |
| remaining monomer content (wt %) | 0.68 | 0.60 | 0.58 | 0.43 | 0.65 | 0.52 | 0.45 | 1.2 | not possible to recover unreacted monomer (>10) | not possible to recover unreacted monomer (>10) | not possible to recover unreacted monomer (>10) |

Improvement of the Weight Ratio D/C of the Recovered Polyacetal Copolymer D With Respect to the Total Supplied Monomer C(=A+B)

Upon comparing Examples 1 to 4 with Comparative Example 1, it was confirmed that it is possible to lengthen the retention time of the raw materials inside the reaction device 1, and as a result of this, the weight ratio D/C can be greatly improved, by carrying out the polymerization reaction of the raw materials in a state where the rotating shafts of the reaction device 1 are inclined 1 to 6° upwards with respect to the horizontal direction H from the input opening of the reaction device 1 (introduction opening 2) to the output opening (polyacetal copolymer recovery portion 5) to obtain a reaction mixture. Further, it was also confirmed that the particle diameter of the recovered polyacetal copolymer is also small.

Further, upon comparing Example 2 or 5 with Comparative Example 3, or Example 4 or 6 with Comparative Example 4, it was confirmed that the weight ratio D/C can be greatly improved by using a non-volatile protonic acid as a catalyst for the polymerization reaction.

Recovery of Unreacted Monomer from the Polyacetal Copolymer

In the case of using a non-volatile protonic acid as the catalyst for the polymerization reaction, it was possible to recover unreacted monomer from the polyacetal copolymer (Examples 1 to 7). On the other hand, in the case of using boron trifluoride (dibutyl ether coordination compound) as the catalyst of the polymerization reaction, it was not possible to recover unreacted monomer from the polyacetal copolymer (Comparative Examples 2 to 4). This is because the boron trifluoride type polymerization catalyst is volatile, and the polymerization catalyst which evaporates along with the recovered monomers causes a polymerization reaction, a large amount of polymer is generated, and a blockage of the recovery path for the monomer occurs.

Improvement of the Weight Ratio D/A of the Recovered Polyacetal Copolymer D With Respect to the Monomer A Newly Supplied to the Reaction Device 1

Upon comparing Example 2 or 5 with Comparative Example 3, or Example 4 or 6 with Comparative Example 4, it can be understood that it is possible to greatly improve the weight ratio D/A by using a non-volatile protonic acid as the catalyst for the polymerization reaction. In the case of using boron trifluoride (dibutyl ether coordination compound) as the catalyst of the polymerization reaction, as described above, it was not possible to recover the unreacted monomer (Comparative Examples 2 to 4).

According to the production method of the present application, compared to the method of the prior art, using simple and energetically favorable steps, it is possible to obtain a suitable polyacetal copolymer in a later step.

EXPLANATION OF REFERENCE NUMERALS 1 reaction device
2 introduction opening
3 mixing portion
4 vaporization and separation portion
5 polyacetal copolymer recovery portion

The invention claimed is:

1. A method for producing a polyacetal copolymer, comprising:
supplying a raw material comprising trioxane, a comonomer which copolymerizes with the trioxane, and a non-volatile protonic acid, to a continuous stirring mixer type reaction device having two parallel shafts which rotate in the same or opposite directions, wherein a multitude of paddles is mounted on each shaft, and a barrel near an outer circumference of the paddles, wherein a long axis end of a paddle periodically comes close to a short axis end of a companion side, wherein the raw material is charged from an introduction opening provided at one end in an axial direction, and wherein a reaction mixture and an unreacted monomer are obtained from a plurality of removal openings provided at the other end;
carrying out a polymerization reaction of the raw material in a state in which the rotating shafts are inclined by 1 to 6° upwards with respect to a horizontal direction from an input opening of the reaction device towards an output opening, and obtaining a reaction mixture;
vaporizing and separating an unreacted monomer from the reaction mixture, and supplying the same to the raw material supply;
and recovering the polyacetal copolymer from the reaction mixture,
wherein a weight ratio D/C of the polyacetal copolymer D with respect to a total supplied monomer C which is defined as a sum of a monomer A which is newly supplied to the reaction device and a monomer B which is recovered from the reaction device and re-supplied, is no less than 0.7;
and a weight ratio D/A of the polyacetal copolymer D with respect to the monomer A which is newly supplied to the reaction device is no less than 0.85.

2. The method for producing a polyacetal copolymer according to claim 1, wherein a content of the unreacted monomer included in the polyacetal copolymer is no more than 1.0 wt %, and the polyacetal copolymer comprises no less than 90 wt % of particles with a particle diameter of no more than 11.2 mm.

3. The method for producing a polyacetal copolymer according to claim 1, wherein L/d which is defined as a ratio of a length L in a direction of the rotating shafts of the reaction device with respect to an inner diameter d in a radial direction of the rotating shafts of the reaction device, is no less than 5 and no more than 20.

4. The method for producing a polyacetal copolymer according to claim 1, wherein the non-volatile protonic acid comprises at least one selected from the group consisting of a heteropoly acid, an isopoly acid and an acid salt thereof.

5. The method for producing a polyacetal copolymer according to claim 1, wherein the non-volatile protonic acid is a heteropoly acid shown by formula (1) below or an acid salt thereof

$$H_x[M_m \cdot M'_n O_l] \cdot y H_2O \qquad \text{Formula (1)}$$

wherein, in the formula (1), M is at least one central element selected from the group consisting of P and Si, M' is one or more coordination elements selected from the group consisting of W, Mo, and V, and
l is 10 to 100, m is 1 to 10, n is 6 to 40, x is 1 or more, and y is 0 to 50.

6. The method for producing a polyacetal copolymer according to claim 5, wherein the heteropoly acid or acid salt thereof comprises at least one compound selected from the group consisting of phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolibdic acid, silicomolybdotungstic acid, silicomolybdotungstovanadic acid and acid salts thereof.

7. The method for producing a polyacetal copolymer according claim 1, wherein the non-volatile protonic acid comprises an isopoly acid shown by formula (2) or (3) below or an acid salt thereof

$$xM^I_2O \cdot pM^V_2O_6 \cdot yH_2O \qquad \text{Formula (2)}$$

$$xM^I_2O \cdot pM^{VI}_2O_6 \cdot yH_2O \qquad \text{Formula (3)}$$

wherein, in the formulas (2) and (3), $M^I$ is hydrogen which may be partially substituted with a metal, $M^V$ is one or more selected from the group consisting of V, Nb, and Ta of group V of the periodic table, $M^{VI}$ is one or more selected from the group consisting of Cr, Mo, W, and U of group VI of the periodic table, p and x are 1 or more, and y is 0 to 50.

8. The method for producing a polyacetal copolymer according to claim 7, wherein the isopoly acid or acid salt thereof comprises at least one compound selected from the group consisting of paratungstic acid, metatungstic acid, paramolybdic acid, metamolybdic acid, paravanadic acid, metavanadic acid, and acid salts thereof.

9. The method for producing a polyacetal copolymer according to claim 1, wherein, wherein the comonomer comprises at least one selected from the group consisting of 1,3-dioxolane, diethylene glycol formal, 1,4-butanediol formal, and ethylene oxide.

* * * * *

UNITED STATES PATENT AND TRADEMARK OFFICE
CERTIFICATE OF CORRECTION

| | |
|---|---|
| PATENT NO. | : 9,550,853 B2 |
| APPLICATION NO. | : 14/786246 |
| DATED | : January 24, 2017 |
| INVENTOR(S) | : Tomohiro Monma, Eiji Masuda and Shoji Sanada |

It is certified that error appears in the above-identified patent and that said Letters Patent is hereby corrected as shown below:

On the Title Page

Item (57), Abstract, Line 14, after "reaction" insert --mixture--.

In the Specification

Column 4, Lines 22-23, "silicomolibdic" should be --silicomolybdic--.

Column 6, Line 45, "pentaerythyritol" should be --pentaerythritol--.

Column 7, Line 50, "silicomolibdic" should be --silicomolybdic--.

Column 7, Line 54, "silicomolibdic" should be --silicomolybdic--.

Column 8, Line 17, "isopolymolibdic" should be --isopolymolybdic--.

Column 8, Line 18, "paramolibdic" should be --paramolybdic--.

Column 8, Line 18, "metamolibdic" should be --metamolybdic--.

Column 8, Lines 20-21, "viewopoint" should be --viewpoint--.

Column 10, Line 40, "C(=A+B)" should be --(C=A+B)--.

Column 11-12, Line 41, "D/C" should be --D/A--.

Column 12, Line 59, "C(=A+B)" should be --(C=A+B)--.

Column 14, Line 54, "silicomolibdic" should be --silicomolybdic--.

Signed and Sealed this
Seventeenth Day of April, 2018

Andrei Iancu
*Director of the United States Patent and Trademark Office*

CERTIFICATE OF CORRECTION (continued)
U.S. Pat. No. 9,550,853 B2

In the Claims

Column 14, Line 58 (Claim 7), after "according" insert --to--.

Column 15, Line 13 (Claim 9), "wherein, wherein" should be --wherein--.